(No Model.)
C. W. COOPER.
APPARATUS FOR EVAPORATING LIQUIDS.
No. 553,841. Patented Feb. 4, 1896.
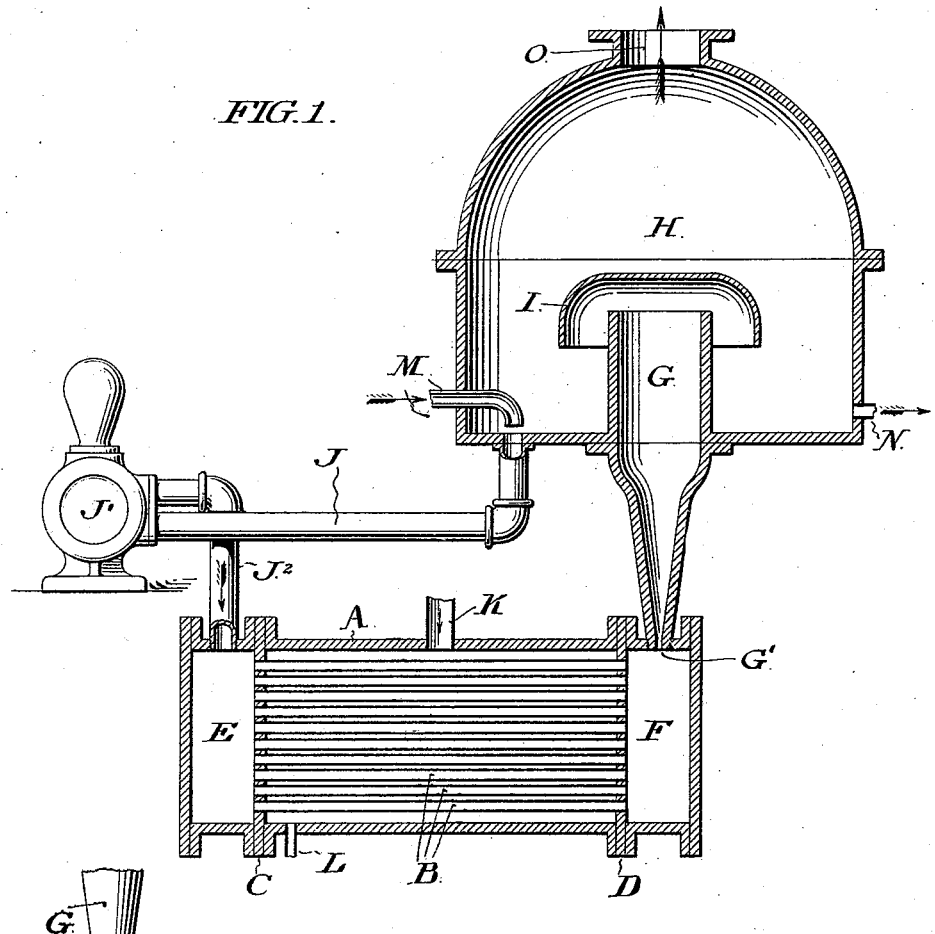
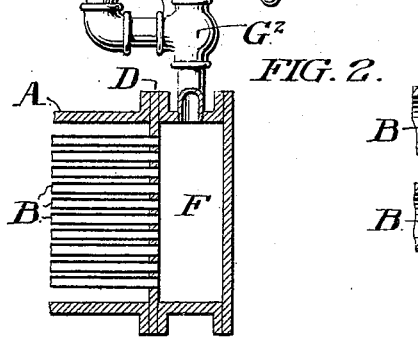
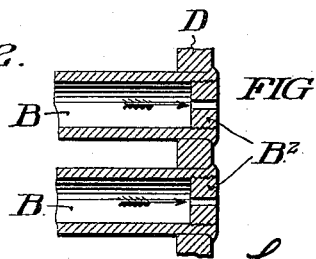
WITNESSES:
N. E. Paige
J. Norman Dixon
C. W. Cooper,
INVENTOR
By his Attorneys,
Wm. C. Strawbridge
J. Bonsall Taylor

UNITED STATES PATENT OFFICE.

CHARLES W. COOPER, OF NEW YORK, N. Y.

APPARATUS FOR EVAPORATING LIQUIDS.

SPECIFICATION forming part of Letters Patent No. 553,841, dated February 4, 1896.

Application filed July 9, 1894. Serial No. 516,943. (No model.)

*To all whom it may concern:*

Be it known that I, CHARLES W. COOPER, a citizen of the United States, residing in the city, county, and State of New York, have invented certain new and useful Improvements in Apparatus for Evaporating Liquids, of which the following is a specification.

In the operation of evaporating liquids by boiling as heretofore conducted nearly if not all of the evaporation has been due to the generation of vapor in the form of bubbles immediately upon the heating-surfaces, the bubbles during their formation and until they are driven off acting to exclude the unvaporized liquid from contact with said surfaces. As the rate of evaporation depends upon the rate at which heat is imparted to the liquid, and as this in turn depends upon the contact of the liquid with the heating-surfaces, it follows that to such extent as by the intervention of non-conducting bubbles is this contact prevented to a corresponding extent will the efficiency of the heating-surfaces for evaporation be impaired, while the greater the adhesion the bubbles have to the heating-surfaces (other conditions being the same) the less will be the rate of evaporation. In certain evaporators in which a rapid scouring action of the liquid along the surfaces reduces the adhesion of the bubbles better results have been secured; but even in evaporators of this class bubbles will form at the heating-surfaces and militate against the efficiency of their operation.

The object of my invention is the production of an evaporator in which, while the evaporation is occasioned by the transmission of heat to the liquid from the heating-surfaces as heretofore, the actual boiling or vaporization of the liquid is prevented to a great extent or entirely from taking place at the surfaces and consequently from forming bubbles upon them.

It is well known that the higher the pressure to which any liquid may be subjected the higher will be the temperature required to cause it to boil. In order, therefore, to accomplish my object of preventing the boiling and the consequent formation of bubbles from taking place at the heating-surfaces, I so construct my apparatus that so long as the liquid is circulating in contact with the heating-surfaces it will be under such a pressure that, although it can absorb heat from said surfaces, it yet cannot boil; whereas, after it has in its circulation passed beyond these surfaces the pressure upon it will become reduced and vaporization due to the heat absorbed in the passage will then take place, with the result that, the liquid then being beyond the heating-surfaces, the bubbles caused by the vaporization cannot form upon said surfaces and thereby impair the efficiency of the apparatus. The conversion of a portion of the liquid into vapor while under the lower pressure reduces the temperature of the remainder, which in its circulation through my apparatus returns repeatedly to the heating-surfaces, and while under the higher pressure in its passage absorbs more heat from said surfaces, which it again parts with in producing further evaporation when it again arrives under its lower pressure.

The alternate heating of the liquid while under the higher pressure at the heating-surfaces, and its evaporation while under a lower pressure away from said surfaces, together with the rapid circulation produced, as hereinafter explained, by means of a pumping apparatus that forces the liquid through the system of heating-surfaces under the higher pressure, and from whence it escapes to a vapor-separating chamber under the lower pressure, constitute the principal features of the invention.

My invention comprehends an evaporating apparatus of the character hereinafter described and claimed.

In the accompanying drawings I have represented three forms of apparatus alike embodying my improvements, although many other forms embodying the essential features of my invention might be adopted.

In the drawings, Figure 1 is a central vertical longitudinal sectional elevation through a form of apparatus conveniently embodying my improvements, and which I find it convenient to employ. Fig. 2 is a similar, but fragmentary, view of a portion of the heating-chamber and outlet therefrom, illustrating the application of a back-pressure valve as a pressure-retaining outlet; and Fig. 3 is a similar view of portions of the ends of heating-tubes, illustrating the application of apertured plugs to constitute a pressure-retaining outlet.

Similar letters of reference indicate corresponding parts.

A is a heating-chamber containing the heating-surfaces, which in the embodiment represented are composed of a number of open-ended horizontally-disposed evaporating-tubes B. These tubes communicate through the tube-heads C and D, into which they tightly pass, respectively, with a tube supply or inlet chamber E, and with a tube discharge or outlet chamber F. From the outlet-chamber F a pipe or discharge-conduit G leads to and enters a vapor or separating chamber H, where it is surmounted by a suitably formed and supported hood or deflector I. From the lower portion of the separating-chamber H a pipe or supply-conduit J communicates with and constitutes the suction-pipe of a pump J', and, issuing from the pump as its discharge-pipe under the designation $J^2$, communicates with the tube supply-chamber E.

The pump represented is of the usual piston type; but, as will be understood, any other kind of pump or liquid-forcing apparatus can be employed.

K is an inlet-pipe to supply steam into the heating-chamber A and around its tubes B.

L is a pipe for the discharge from said chamber of the water resulting from the condensation of the steam.

M is a liquid-supply pipe for supplying the evaporator with the liquid to be evaporated.

N is a liquid-discharge pipe (placed lower than the top orifice of the discharge-conduit G) for discharging the concentrated liquid, and O is a vapor-discharge pipe from the chamber H.

The passage or conduit G from the outlet-chamber F to the separating-chamber H is diametrically reduced at G' so as to form a constriction, which, while not so small as to prevent the pump from forcing the desired liquid in circulation through it, is yet sufficiently small to retain enough back-pressure in the evaporating-tubes to prevent boiling in them. The constriction may be formed by reducing the diameter of the liquid passage or discharge conduit, as indicated in Fig. 1; or it may be formed by a back-pressure valve $G^2$, located in the discharge-conduit and under the control of a suitable valve-adjusting lever $G^3$, as shown in Fig. 2; or, again, it may be formed by occluding to the desired degree the outlet ends of the evaporating-tubes B—as, for instance, by fitting into them plugs $B^2$, having small apertures through them, as shown in Fig. 3.

For convenience of designation I term the restricted passage constituted by the constriction G' or the valve $G^2$ or the apertured plugs $B^2$ a "pressure-retaining outlet."

In the operation of an apparatus of the foregoing character, the pump J' being in action to produce circulation the liquid supplied through the liquid-supply pipe M circulates from the separating-chamber H through the supply-conduit J, pump J', conduit $J^2$, inlet-chamber E, heating-tubes B, outlet-chamber F, pressure-retaining outlet G' or $G^2$ or $B^2$ and conduit G into the separating-chamber H again, and so on repeatedly. As the liquid enters the supply-conduit J it has a temperature corresponding to the boiling-point, that is due to the pressure of vapor in the separating-chamber H; but while passing through the heating-tubes B it will have the pressure due to the action of the pump in forcing it through the pressure-retaining outlet G' and be under greater pressure than that of the chamber H. This greater pressure will cause the boiling-point to be higher in the tubes B and enable the liquid to absorb a certain amount of heat without boiling, so that if enough liquid be pumped through the tubes to cause the required circulation through the tubes B and the constriction through the pressure-retaining outlet be sufficient to occasion the required pressure in said tubes the liquid will absorb all the heat that the tubes can impart to it without boiling before it emerges from them. After the liquid passes through the pressure-retaining outlet the pressure upon it will become reduced to the point where the heat absorbed by it while passing through the tubes B will cause it to boil, and hence partially vaporize. The boiling will abstract heat from the liquid, which in the form of commingled liquid and vapor will emerge from the top of the conduit G as foam or spray reduced to the original temperature. This foam or spray will be deflected downward by the hood I, the weight and momentum of the liquid carrying it to the bottom of the separating-chamber H and the vapor separating from it and passing upward and out through the vapor-discharge pipe O. The liquid thus falling and depositing in the separating-chamber H is added to by the supply from the pipe M and again circulates through the apparatus, as before described, thereby continuously keeping up and repeating the circulation and evaporation just described. The excess of liquid supplied through the liquid-supply pipe M over the amount that passes off as vapor is discharged in its concentrated condition through the liquid-discharge pipe N.

In the foregoing description I have shown as the preferred heating-surfaces tubes inclosed in a steam-chamber and arranged for the liquid to flow through them. The form of the system of heating-surfaces through which the liquid is caused to circulate is not, however, of the essence of the invention.

The divisional arrangement described in the specification of the invention for which Letters Patent of the United States, No. 482,340, were granted to me September 13, 1892, for evaporating liquids, is applicable also to my present apparatus, which, however, is peculiarly adapted for evaporation under vacuum for the reason that the less vapor tension there is in the separating-chamber H the greater will be the difference in any given apparatus between the boiling temperature of that chamber and that of the heating-tubes B, and consequently the greater will be the capacity of the liquid to absorb heat while passing through the tubes without boiling in them.

Having thus described my invention, I claim and desire to secure by Letters Patent—

1. A liquid-evaporating apparatus wherein are combined the following elements: a vapor and liquid separating chamber, a pump having a pipe leading out from said separating-chamber and a pipe leading into a heating-chamber, a heating-chamber embodying evaporating-tubes through or in contact with which the liquid is caused to pass and thereby subjected to the heat within the chamber, a contracted pressure-retaining outlet in the passage leading from said heating-chamber into said separating-chamber, and a deflecting device within the separating-chamber, substantially as and for the purposes set forth.

2. A liquid-evaporating apparatus wherein are combined the following elements: a vapor and liquid separating chamber, having a vapor-discharge pipe or outlet, a pump having a pipe leading out from said separating-chamber, and a pipe leading into a heating-chamber adapted to contain steam, and provided at its respective ends with tube-heads between which a series of open-ended heating-tubes are supported and tightly mounted, and also provided with an inlet-chamber and an outlet-chamber, a contracted pressure-retaining outlet in the passage leading from said heating-chamber to the separating-chamber, and a deflecting device within said chamber, substantially as and for the purposes set forth.

In testimony that I claim the foregoing as my invention I have hereunto signed my name this 29th day of June, A. D. 1894.

CHAS. W. COOPER.

In presence of—
   J. BONSALL TAYLOR,
   F. NORMAN DIXON.